Jan. 27, 1931.    J. A. CAMPBELL    1,790,224
COLLECTOR PAN FOR ABSORBERS
Filed April 19, 1927    2 Sheets-Sheet 1

Inventor
Julian A. Campbell

Attorney

Jan. 27, 1931.    J. A. CAMPBELL    1,790,224
COLLECTOR PAN FOR ABSORBERS
Filed April 19, 1927    2 Sheets-Sheet 2

Inventor
Julian A. Campbell
Attorney.

Patented Jan. 27, 1931

1,790,224

UNITED STATES PATENT OFFICE

JULIAN A. CAMPBELL, OF LONG BEACH, CALIFORNIA

COLLECTOR PAN FOR ABSORBERS

Application filed April 19, 1927. Serial No. 184,867.

This invention has to do with devices of the type commonly known as absorbers, and more particularly with an absorber of the general type shown in my Patent No. 1,643,696, issued to me Sept. 27, 1927, the present invention being in some aspects an improvement upon that type of absorber.

Although I speak particularly of absorbers, it will be understood that the invention is not necessarily limited to apparatus that are used specifically as absorbers, but that it may be used for any purpose to which an "absorber" apparatus may be put. Specifically absorbers are usually used for absorbing vapors or gases from a gas into an absorbing liquid; but they may be used for opposite transfer of such vapors; and in general their function is that of bringing two fluids into more or less intimate contact so that an absorbable fluid carried by one of the carrier fluids may be absorbed into the other, the general operation being one in which an equilibrium, as regards carriage of vapors, is reached as between the original carrier fluid and the absorbent fluid. Thus such devices as I hereinafter explain are not only commonly used as absorbers, but also as de-gasifiers or vapor separators or as dephlegmators.

In the type of apparatus of which I speak here particularly, and referring to its typical use for absorbing vapors from a gas into a liquid, the absorbing liquid is passed down through a tower from floor to floor, the upwardly traveling gas passing through the liquid at each floor to form froth, the froth being continuously broken up above each floor and the resultant clear absorbing liquid passing down to the floor next below there again to be refrothed. That is the general mode of operation of the absorber explained in my said prior application. For breaking up the froth above each floor a pan or series of pans is provided, preferably with sharp edges over which the liquid flows when the body of froth reaches the level of those edges. In flowing over the sharp edge, at the upper surface of the body of froth, the froth is broken up and, within the operating capacity range of the device, nothing but clear liquid flows over into the pan. The liquid then flows from that pan through a standpipe down through the floor to a point near the floor next below; and the hydrostatic head of liquid in the tube prevents the gas from passing up through the tube instead of passing up through the perforated floors. That hydrostatic head thus represents the limit of difference of pressure that can be applied to opposite sides of any perforated floor. If the froth is not well broken up as it passes over into the pan, so that froth rather than clear liquid then stands in the tube, the permissible operating pressure is lessened or the gas passes upwardly through the tube and froth and absorbing liquid are eventually carried off from the final gas discharge of the apparatus. And the presence of entrained gas in the liquid also cuts down its vapor absorbing ability. Thus the effective capacity as well as the efficiency of the apparatus are dependent upon efficient breaking up of the froth so that the absorbing liquid is delivered downwardly from floor to floor freed from gas to the largest possible degree.

I have found that by increasing the extent of the froth breaking pan edge, without at the same time increasing the size of the pans and thereby decreasing the upper free area of the body of froth, I can remarkably increase the capacity and efficiency of such an absorption apparatus. As I have said, both the capacity and efficiency of the apparatus depend upon the froth being well broken up so that nothing but clear liquid passes from floor to floor; but at the same time in an absorber it is desirable and necessary that the upper surface of the body of froth present a comparatively large area for the free relief and passage off of the entrained gas. Specifically my invention is aimed at increasing the capacity of the froth breaking edge without correspondingly decreasing the free surface area of the froth body; how this is done in a preferred way typical of my present invention will be best understood from the following detailed description, for the purpose of which I make reference to the accompanying drawings, in which—

Figure 1:
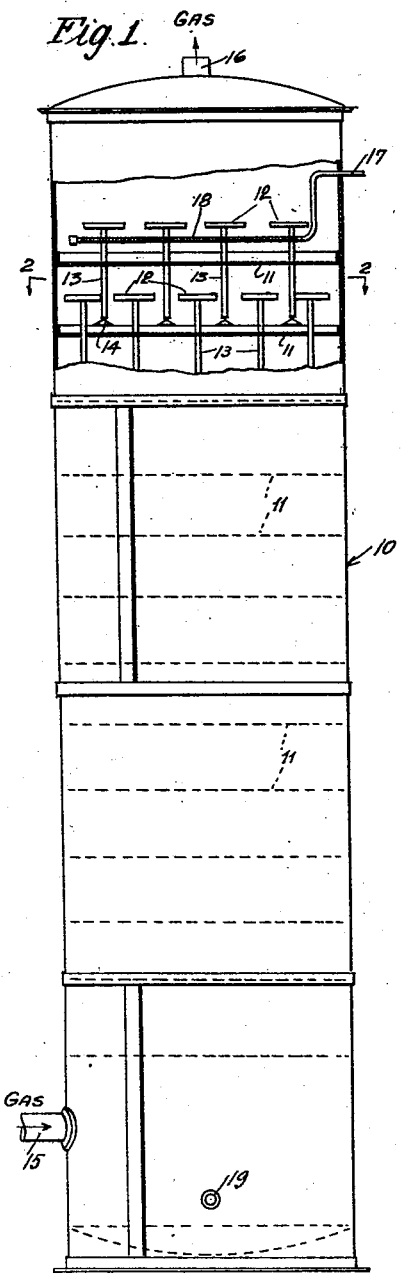
Fig. 1 is a more or less diagrammatic elevation of an absorbing tower of the type concerned in my present invention, parts being broken away for purpose of illustration.
Figure 2:
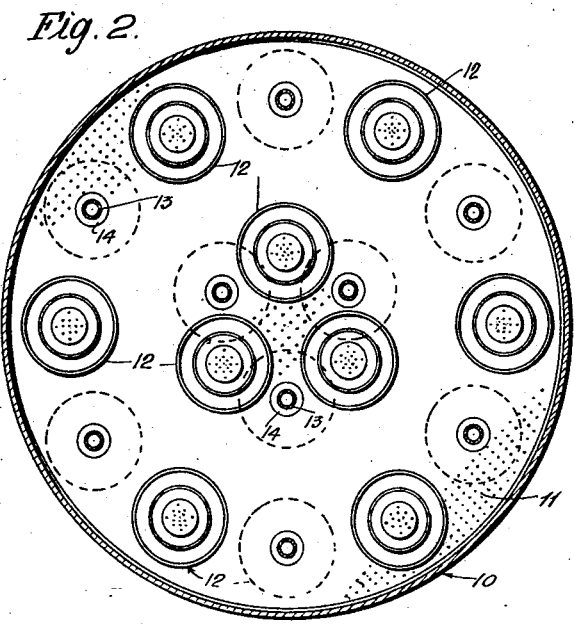
Fig. 2 is an enlarged horizontal section on line 2—2 of Fig. 1.
Figure 3:
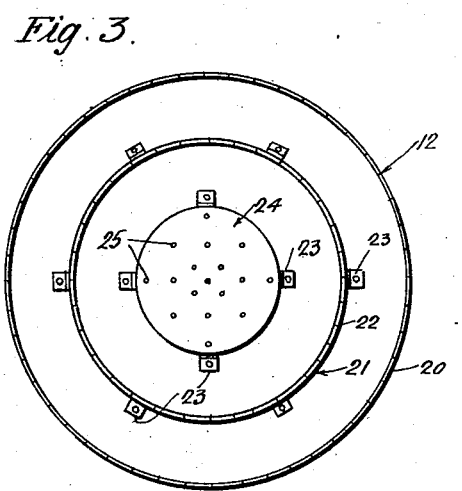
Fig. 3 is an enlarged plan view of one of the pans and its appurtenances.
Figure 4:
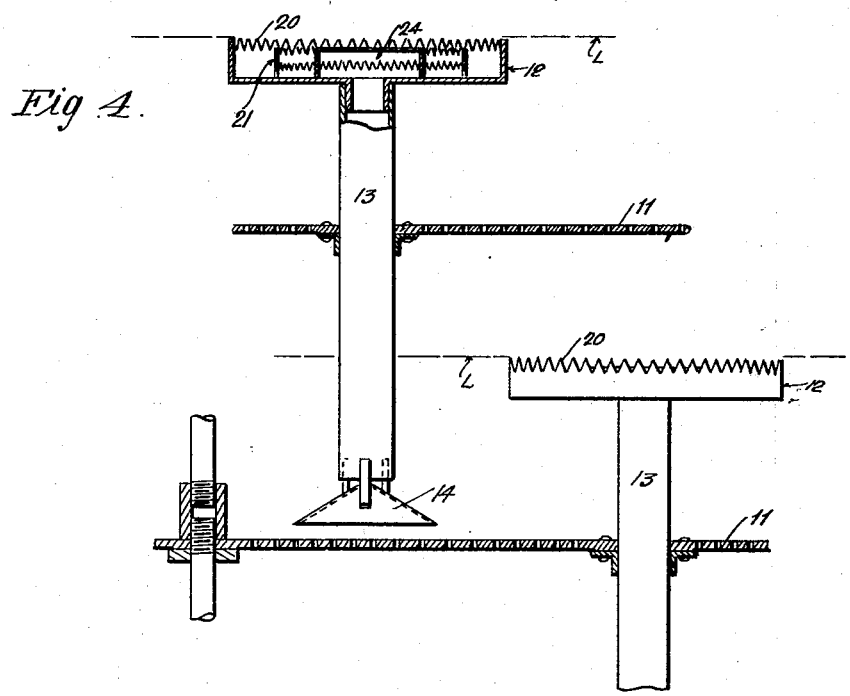
Fig. 4 is an enlarged fragmentary detail and vertical section showing the pans and their arrangements.
Figure 5:
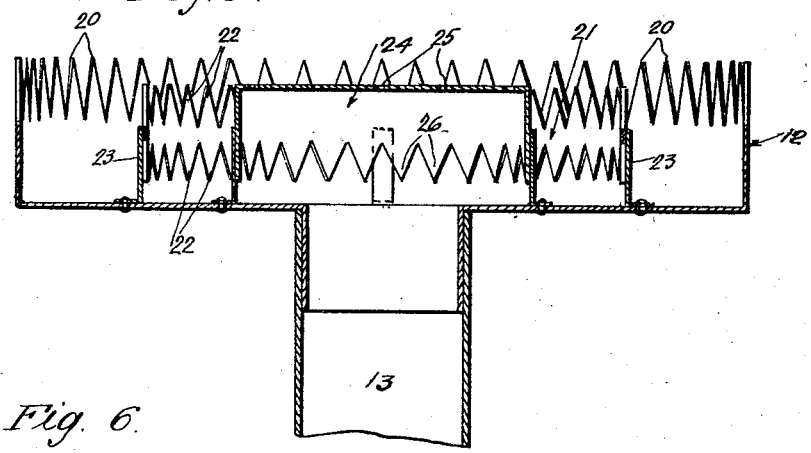
Fig. 5 is a further enlarged detail section of a single pan.

The absorbing apparatus of which I speak is usually in the form of a tower having a shell 10 and provided with a number of spaced superposed perforated floors 11. Above each floor I usually place a number of pans 12, each mounted on a tube 13 which passes through the corresponding floor and ends at a point near the floor next below, as is shown in Figs. 1 and 4, the lower end of each tube usually being provided with a spreader or distributor such as illustrated at 14. In the operation of such an absorber the laden gas is fed in at the bottom as at 15 and the denuded gas passes out at the top as at 16, the lean absorbing liquid being fed in through a pipe 17 and a distributor 18 above the uppermost floor, and the laden absorbing liquid being taken out at the bottom as at 19. Gas is fed in under a suitable pressure and the pressure drop from floor to floor is sufficient to force the gas up through liquid distributed over the successive perforated floors, and to froth it and sufficient to prevent the liquid from passing down through the perforations. The liquid and gas form a mass of froth over each floor, and the froth rises to a level such as indicated at L in Fig. 4, substantially at the level of the upper edges of the pans. At its upper surface the froth tends to break up, the gas passing upwardly into the space above the froth body and then passing on up through the next perforated floor, and the released liquid flowing over the edge of the pan. This flow of the released liquid over the pan edge creates a surface flow of the froth and liquid toward the pans, the gas is relieved at the surface, and the breaking up of the froth and release of the gas and liquid takes place most largely where the froth passes over the edge of the pan, that edge being preferably sharp.

I have found that I can materially increase the froth breaking capacity of the apparatus and at the same time maintain a large free upper froth surface by forming the edge of the pan into a plurality of serrations or teeth 20, as illustrated in the drawings. I find in practice that teeth of about the proportionate width and depth illustrated give very good practical results. This toothed or serrated edge of the pan is preferably formed by shearing or punching so that a sharp raw edge is left, and this sharp raw edge of comparatively great aggregate length is very effective in breaking up the froth quickly and cleanly.

Besides serrating the edges of the pan I also preferably place within the pan a ring 21 which has serrations or teeth 22 at both its upper and lower edges, the ring being preferably supported somewhat above the bottom of the pan by suitable supports 23 and the upper edge of the ring being lower than the edge of the pan. Again, within this ring, I may place an inverted cup 24 perforated as at 25 through its top wall, supported with its lower edge above the bottom of the pan, and its lower edge also being toothed or serrated as shown at 26. The serrated edges of the ring and cup are also preferably sharp and preferably made in the same manner as the edge of the pan. These serrated edges add very materially to the aggregate length of froth breaking edge presented by each pan, and any froth that passes unbroken over the serrated edge of the pan proper is almost sure of being broken up in passing under or over the serrated edges of the ring and under the serrated edge of the cup. Any gas freed within the cup may pass upwardly through perforations 25; and at the same time the upper wall of the cup protects the tube 13 from receiving any froth which may by any possibility stand above the pan or above the cup. It is impossible for any froth to get to a position above the upper end of tube 13 without passing first over the edge of the pan and then over or under the edges of the ring and then finally under the edge of the cup.

The result of this arrangement is that the froth is very thoroughly broken at a comparatively high rate and that substantially nothing but clear liquid freed of gas passes down into tube 13 to be delivered to the next floor. Tube 13 therefore at all times is more or less filled with clear liquid and the differential gas pressure maintained from floor to floor may be as high as that represented by the hydrostatic head of liquid in the whole length of the tube 13. Thus the operating gas pressure may be relatively much higher than it could be if the tubes contained some froth, the gas can therefore be passed through the apparatus to froth the oil faster and the capacity for breaking froth is high enough to take care of this faster formation of froth. The capacity of the whole apparatus is thus very materially increased, and furthermore the absorbing efficiency of the apparatus is increased because the absorbing liquid each time it is passed from floor to floor is freed of its entrained gas and therefore has a higher vapor absorbing capacity than it would have if it were more or less loaded with entrained gas as it moves down from floor to floor.

Figure 6:
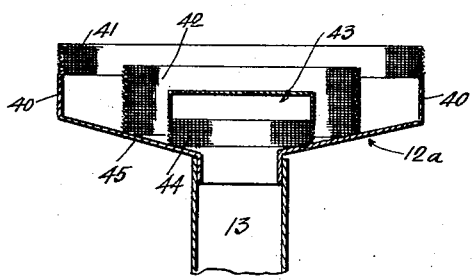
Fig. 6 is a section similar to that of Fig. 5, showing a modified form of pan.

The general feature underlying my invention lies in the provision of a froth breaking "edge" so to speak, that presents a substantially greater aggregate froth breaking length than the length of the periphery of the pan itself, thus enabling the pan to remain comparatively small, as set forth, and yet present a large aggregate length of froth breaking edge. A fine wire will present a froth breaking edge and a fine wire screen will likewise present a large aggregate length of froth breaking edge. To illustrate such a modification of the broad invention I show in Fig. 6 a pan 12a having an upturned edge 40 carrying an upper rim of fine wire screen 41. The froth flows over the upper edge and through meshes of the fine wire screen, the fine wires forming multiple edges of great aggregate length that break up the froth. Inside the rim of the pan and below its upper edge may be located a screen ring 42 and then inside that ring there may be the inverted cup 43 similar to that inverted cup 24, except that it may have at its lower edge the fine wire screen 44 for breaking up the froth. Also in Fig. 6 I illustrate a pan with a sloping bottom 45, the sloping bottom tending to feed the liquid toward the liquid delivery tube 13.

I claim:

1. In a device of the character described having means for forming a body of froth from liquid and gas, froth breaking means comprisng a pan having a rim presenting a sharp froth breaking edge of a total length substantially greater than the periphery of the pan and a froth breaking element located inside the pan below its upper edge and above its bottom, and presenting a sharp froth breaking edge.

2. In a device of the character described having means for forming a body of froth from liquid and gas, froth breaking means comprising a pan having a rim presenting a sharp froth breaking edge of a total length substantially greater than the periphery of the pan, a liquid delivery tube leading downwardly from the bottom of the pan, and an inverted cup located over the liquid delivery tube and presenting a sharp froth breaking edge around the lower part of its rim.

3. In a device of the character described having means for forming a body of froth from liquid and gas, froth breaking means comprising a pan having a rim presenting a sharp froth breaking edge of a total length substantially greater than the periphery of the pan, a froth breaking element located inside the pan below its upper edge and above its bottom, and presenting a sharp froth breaking edge, a liquid delivery tube leading downwardly from the bottom of the pan, and an inverted cup located over the liquid delivery tube and presenting a sharp froth breaking edge around the lower part of its rim.

4. In a device of the character described having means for forming a body of froth from liquid and gas, froth breaking means comprising a pan with a serrated sharp edge, and a serrated edged annulus within the pan supported above its bottom and below the pan edge.

5. In a device of the character described having means for forming a body of froth from liquid and gas, froth breaking means comprising a pan with a serrated sharp edge, a liquid delivery tube extending down from the center of the pan, an inverted cup supported above the bottom of the pan over the liquid delivery tube, the upper wall of said cup being perforated and its lower edge being sharp and serrated, and an annulus supported in the pan above its bottom and below the pan edge and spaced between the pan edge and the cup, both the upper and lower edges of the annulus being sharp and serrated.

6. In a device of the character described having means for forming a body of froth from liquid and gas, froth breaking and liquid delivery means comprising a pan with a sharp froth breaking edge, a liquid delivery tube extending down from the center of the pan, and an inverted cup supported over the upper end of the tube to protect it against entry of froth.

7. In a device of the character described having means for forming a body of froth from liquid and gas, froth breaking and liquid delivery means comprising a pan with a sharp froth breaking edge, a liquid delivery tube extending down from the center of the pan, and an inverted cup with a lower sharp froth breaking edge and a perforated upper wall, supported over the upper end of the tube to protect it against entry of froth.

8. In a device of the character described, an exterior shell, a plurality of superposed spaced and perforated floors in the shell, means to deliver liquid over the uppermost floor, means to deliver gas under the lowermost floor, spaced froth overflow pans with edges at an elevation above each floor and with liquid delivery tubes extending from their bottoms through their corresponding floors to points above the floor next below, said pans occupying less than the whole horizontal sectional area over the floor so as to leave a considerable froth area uncovered, and said pans having serrated froth breaking edges.

9. In a device of the character described, an exterior shell, a plurality of superposed spaced and perforated floors in the shell, means to deliver liquid over the uppermost floor, means to deliver gas under the lowermost floor, spaced froth overflow pans with edges at an elevation above each floor and with liquid delivery tubes extending from their bottoms through their corresponding floors to points above the floor next below, said pans occupying less than the whole horizontal sectional area over the floor so as to leave a considerable froth area uncovered, said pans having serrated froth breaking edges, and a serrated froth breaking annulus within each pan above its bottom and below its edge.

10. In a device of the character described, an exterior shell, a plurality of superposed spaced and perforated floors in the shell, means to deliver liquid over the uppermost floor, means to deliver gas under the lowermost floor, spaced froth overflow pans with edges at an elevation above each floor and with liquid delivery tubes extending from their bottoms through their corresponding floors to points above the floor next below, said pans occupying less than the whole horizontal sectional area over the floor so as to leave a considerable froth area uncovered, said pans having serrated froth breaking edges, a serrated froth breaking annulus within each pan above its bottom and below its edge, said annulus having serrated upper and lower edges, and an inverted cup supported centrally in the pan above its bottom, said cup having a serrated lower edge and having a perforated top wall, said cup standing over the liquid delivery tube.

11. In a device of the character described having means for forming a body of froth from liquid and gas, froth breaking and liquid delivery means comprising a pan having a rim presenting a sharp froth breaking edge of a total length substantially greater than the periphery of the pan, and a liquid delivery tube extending down from the pan and within said froth body, the froth being adapted to overflow into said pan and to become broken up by the sharp rim thereof, and the liquid in the pan thence being conducted downwardly through said pipe.

12. In a device of the character described having means for forming a body of froth from liquid and gas, froth breaking and liquid delivery means comprising a pan having a rim presenting a serrated sharp edge, and a liquid delivery tube extending down from the pan and within said froth body, the froth being adapted to overflow into said pan and to become broken up by the sharp rim thereof, and the liquid in the pan thence being conducted downwardly through said pipe.

In witness that I claim the foregoing I have hereunto subscribed my name this 29 day of March, 1927.

JULIAN A. CAMPBELL.